(12) United States Patent
Bernard

(10) Patent No.: US 6,271,452 B1
(45) Date of Patent: Aug. 7, 2001

(54) TRAINING BAR

(76) Inventor: Gilles Bernard, 5611 Rue St-Laurent, Lévis (CA), QC G6V 3V6

( * ) Notice: Subject to any disclaimer, the term of this patent is extended or adjusted under 35 U.S.C. 154(b) by 0 days.

(21) Appl. No.: 09/503,213

(22) Filed: Feb. 12, 2000

(30) Foreign Application Priority Data

Feb. 15, 1999 (CA) .................................................. 2260001

(51) Int. Cl.$^7$ .................................................. G10G 7/00
(52) U.S. Cl. .............................................. 84/453; 84/328
(58) Field of Search ...................... 84/453, 328; 248/118, 248/118.1, 118.3

(56) References Cited

U.S. PATENT DOCUMENTS

| | | | |
|---|---|---|---|
| 1,892,048 | * 12/1932 | Genung | 297/411.21 |
| 1,955,521 | * 4/1934 | White | 248/118 |
| 2,496,276 | * 2/1950 | Dolas | 248/118 |
| 5,135,190 | * 8/1992 | Wilson | 248/118.1 |
| 5,158,256 | 10/1992 | Gross | 248/118.3 |
| 5,465,931 | 11/1995 | Macdonald | 248/118.3 |
| 5,567,067 | * 10/1996 | Ambrose | 400/472 |
| 5,753,840 | 5/1998 | De Albuquerque | 84/453 |

* cited by examiner

Primary Examiner—Shih-Yung Hsieh

(57) ABSTRACT

A training bar (24) to be used by a keyboard user, particularly useful for exercising on a piano. It serves as a support for the wrists and is a reference and a guide for the movement of the hands on the keyboard (20). A smooth bar, parallel to the keyboard, may be adjusted in height and distance by the sides and the final position set to the desired height by a central handle. Two arms (28) are fixed perpendicularly to the smooth bar. A handle (39) allows a U-shaped fixing tube (32) to rotate under the keyboard: the tube has two extensions that connect with the arms, through a joint (50) that permits a rotary movement, allowing to position the smooth bar according to the player's desired height for the exercise to be done, The joint permits the storing of the bar under the keyboard. The fixing tube may be supported by fasteners (34) or by a stand, as a portable option. A pedal may move the handle.

17 Claims, 8 Drawing Sheets

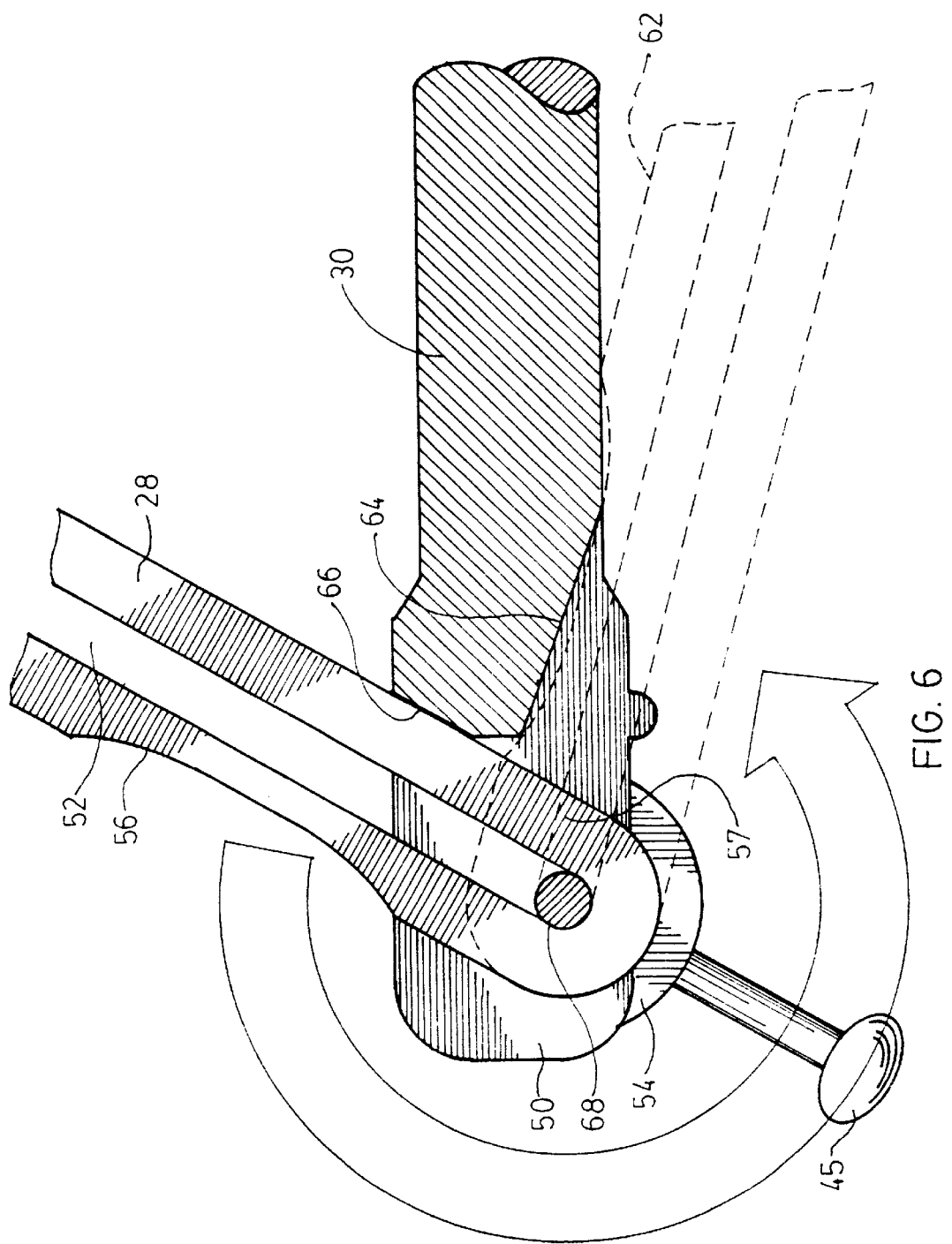

TRAINING BAR

BACKGROUND

1. Field of the Invention

This invention belongs to the family of training apparatus, more precisely the ones for music instruments with keyboards, such as a piano, a synthesizer, a harpsichord or an organ.

BACKGROUND

2. Description of the Prior Art

Some patents have drawn our attention:

U.S. Pat. No. 5,753,840, De Albuquerque, May 19, 1998 is a support for the arms and hands of a user of a keyboard, for drawing, or for knitting. It can slide horizontally along a frame and swivel. But it does not allow for quick vertical movements of the hands. A pianist does not have the freedom necessary to interpret a musical piece.

U.S. Pat. No. 5,465,931, Macdouald, Nov. 14, 1995 has a mechanism for relieving stress on the hands of a person operating a computer keyboard. It comprises an adjustable support bar fixed on both sides of a sliding panel on which rests the keyboard. The support bar is in the same plane as two horizontal arms but does not comprise two vertical arms, nor a double adjustment pivot that would allow the removal of the bar. This apparatus cannot support the keyboard of a piano nor be installed under one without modifications.

U.S. Pat. No. 5,158,256, Gross, Oct. 27, 1992 illustrates a pad support for each wrist of a keyboard operator. Two pads slide along the keyboard. The support is constant but is not applicable to a technique where the user only touches the bar lightly.

OBJECTS AND ADVANTAGES

The first objective of this invention is to provide a training bar that helps a pianist take a good posture while playing. To help beginners to always keep the same rectilinear posture guided by the bar. To reduce the tension on the fingers caused by the superior members, by providing a base on which the wrists are placed, thus avoiding tendinitis. An apparatus which is to help building the muscular strength of the fingers, by alternating the support of the wrists on the bar with the non-support, that is the weight of the arms on the fingers. A bar which can be adjusted to different users, giving them a distant position, allowing them to play longer and more quickly with a better control of their fingers, without getting tired. A bar which is to serve as a guide for the blind.

Another objective is to provide a bar made of smooth wood or any to other smooth material, mounted to the ends of a keyboard, a bar which is to comprise means of adjusting the bar vertically and horizontally, means for locking it at the desired position, under a keyboard support structure, and a fast system that allows lowering or adjusting the bar by one stroke of a handle.

Another objective is to develop a method for beginners and pianists at any level. A method which may comprise a series of exercises to do with the training bar.

BRIEF DESCRIPTION OF THE DRAWINGS

The present invention will be further understood from the following description with reference to the drawings in which:

FIG. 6 is an enlarged section, according to arrow 6 of FIG. 5.

DESCRIPTION OF THE PREFERRED EMBODIMENT

Figure 1:
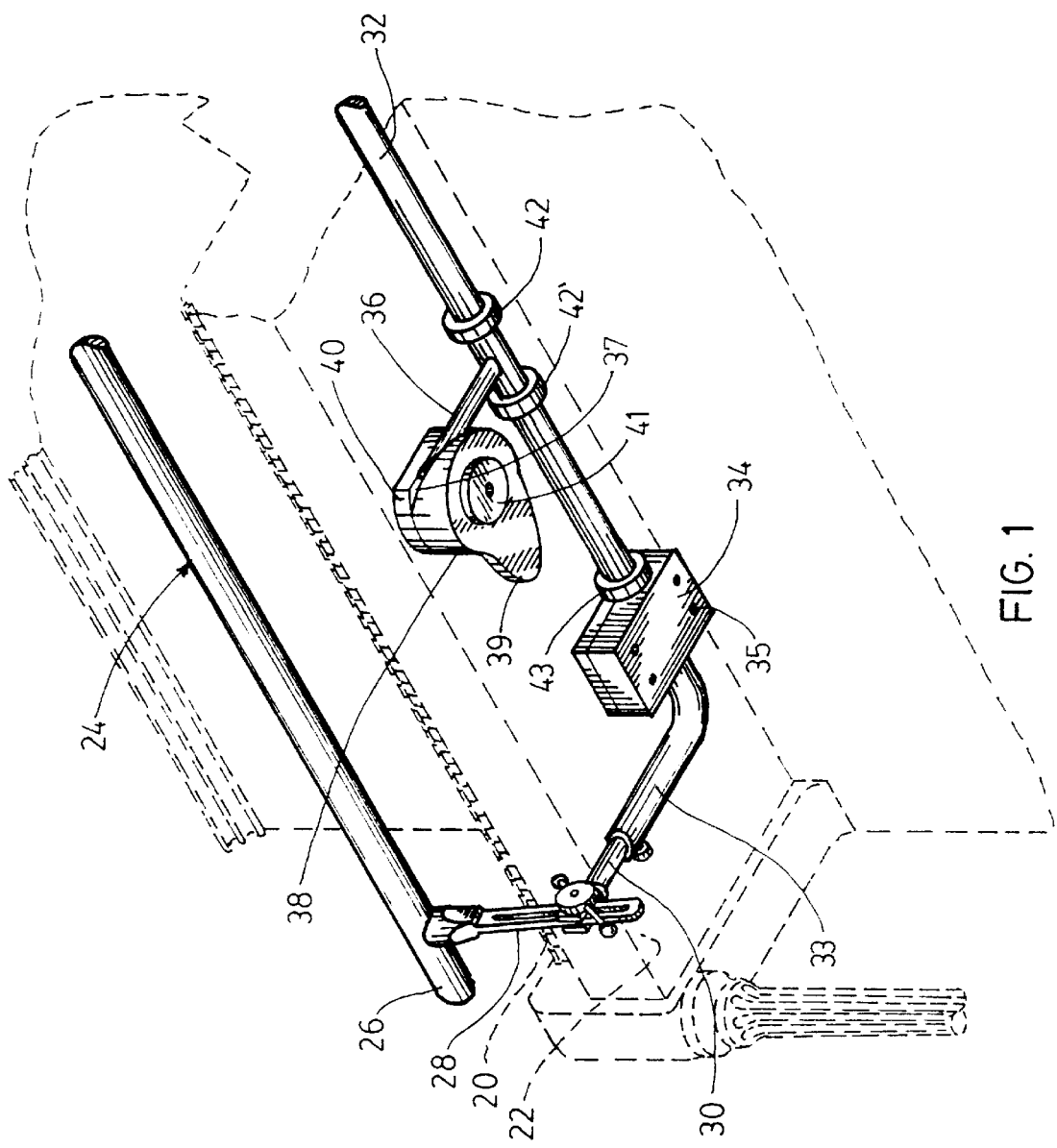
FIG. 1 is a perspective of the training bar, mounted under the keyboard of a piano (in dotted lines).

The preferred embodiment of the invention is illustrated in the drawings wherein the same numbers identify the same characterising elements.

FIG. 1 illustrates a keyboard 20, in dotted line, being supported by a table 22 of an instrument, also in dotted lines, equipped with a training bar 24. A smooth bar 26, preferably well polished, on which a player rests his wrist, can be adjusted by a vertical support 28, perpendicular to the bar 26 and allows to lower or lift the smooth bar, according to the height required by the player. The distance between the smooth bar 26 and the keyboard 20 can be adjusted by a horizontal support 30. A U-shaped fixation tube 32, located linder the table 22, has two arms 33 that hold and position the horizontal support 30. The fixing tube 32 is held by and rotates in fasteners 34 fixed in place by fixing screws 35. The location of the fasteners 34 may vary according to the type of piano. The horizontal support 30 slides in the tubular arms 33. A lever rod 36 for adjusting the inclination is fixed perpendicularly to the fixing tube 32 and moved by a knob 38, located under the table 22, in cantilever with the fixation tube 32. The knob 38 is operated by a handle 39 and comprises an inclined plane 37 that pushes the lever rod up to a fixed ring 40 also attached to the table 22. When the lever rod moves up, it rotates the tube 32 and thus brings the arms 33 close to the face of the table. The lever rod is shorter than the tube 33, so when the arms touch the table 22 there is a space between the table and the lever rod. If the inclined plane moved by the handle 39 keeps applying pressure against the lever rod, the lever rod will rotate and twist the tube shaft and will create a certain rigidity of the elasticity at the contact with the smooth bar 26. A pair of support rings 42 are installed around the fixation tube 32 and close to the lever rod to insure that the tube 32 is at the same distance from the table 22 on all its length Positioning rings 43, resting against both sides of each fastener 34 keep the tube 32 from moving sideways. The smooth bar 26 should be made of polished wood or any other smooth material to allow the wrists of the player to slide easily on the smooth bar 26.

Figure 2:
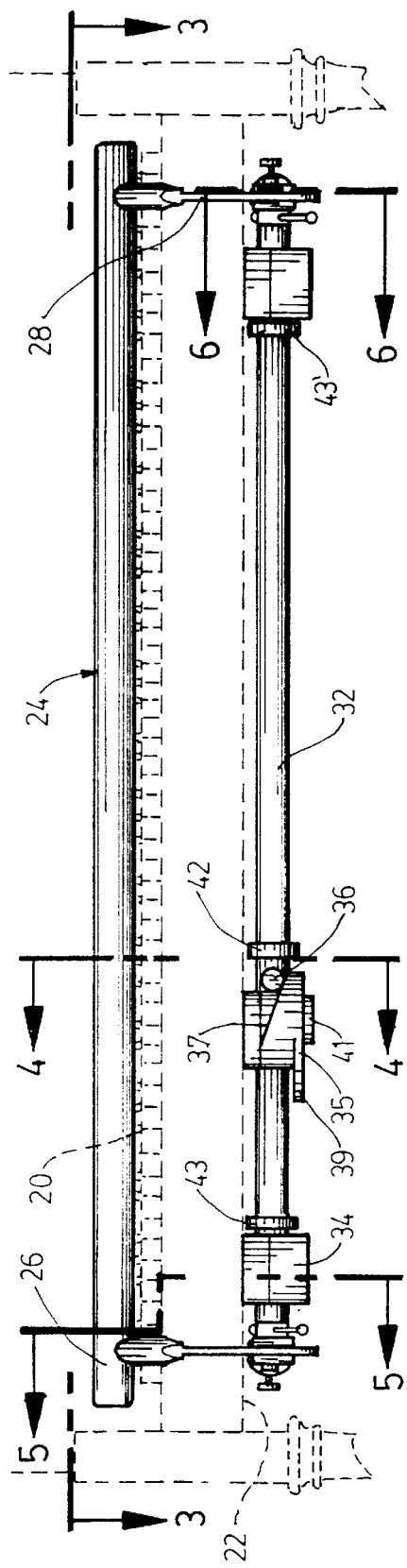
FIG. 2 is a front view of the bar of FIG. 1.

FIG. 2 shows the bar 26, alongside the keyboard 20. The vertical supports 28 and the fasteners 34 are located at each end of the smooth bar 26. The fasteners 34 can be fixed at the desired position under the table 22. The positioning rings 43 are fixed at the ends of tube 32 without stopping it from rotating. The support rings 42 are mounted around the tube 32, close to the lever 36. The support rings 42 are in contact with the underside of the table 22. They are preferably made of rubber.

Figure 3:
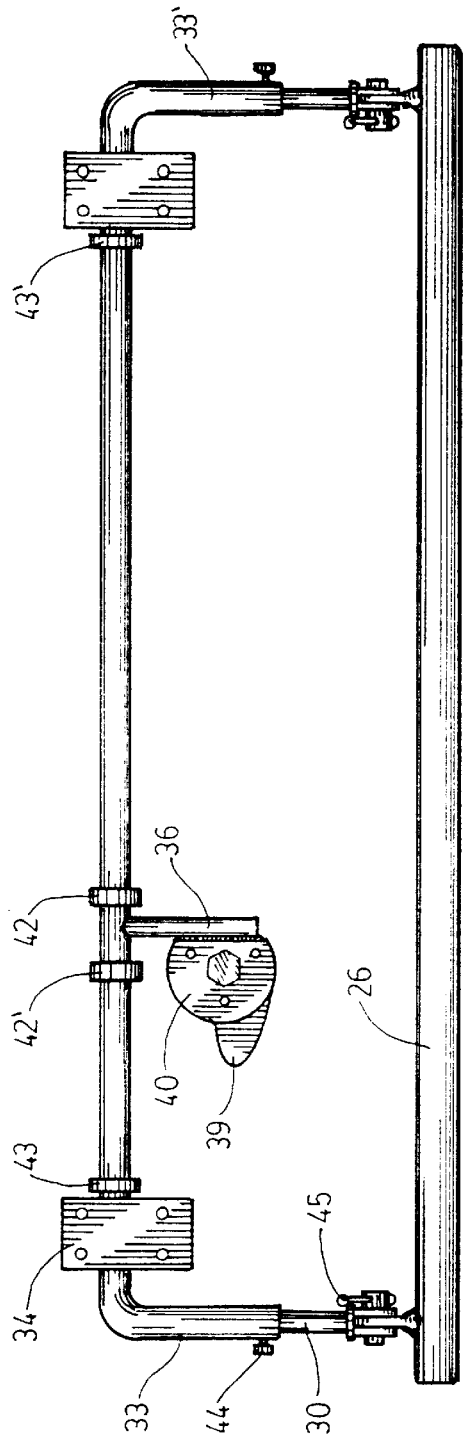
FIG. 3 is a top view of the bar according to line 3—3 of FIG. 2.

FIG. 3 shows the training bar 24 without the instrument. The horizontal support 30 can be adjusted and may slide inside the arm 33 of the tube 32. The entry level is set by a key 44. There is a handle 45 at the end of the horizontal support 30.

Figure 4:
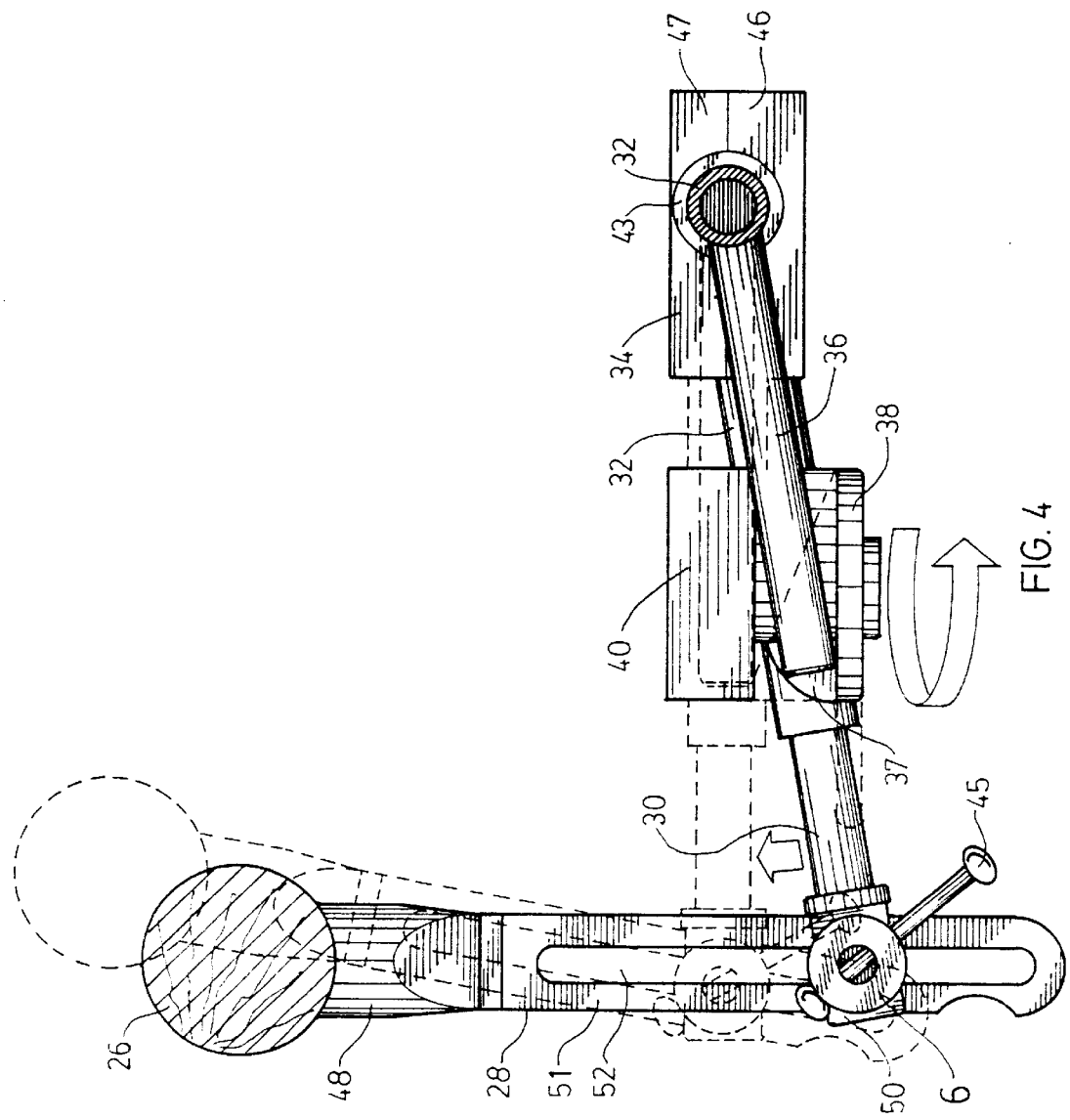
FIG. 4 is an enlarged section, according to line 4—4 of FIG. 2, in reverse.

FIG. 4 illustrates the adjustment of the inclination of the smooth bar 26. When the knob 38 is turned, the inclined plane 37—rotating in the direction shown by the arrow—brings the lever 36 up to the fixed ring 40. The fastener 34 comprises two parts covering the tube 32, namely a lower part 46 and an upper part 47, attached under the table and surrounding the tube 32. The screws 35 keep the interior and superior parts in contact and fixed to the table. The lever 36, resting on the inclined plane 37 of the knob 38 follows and drags the tube 32 and its arms 33 holding the horizontal support 30.

Figure 5:
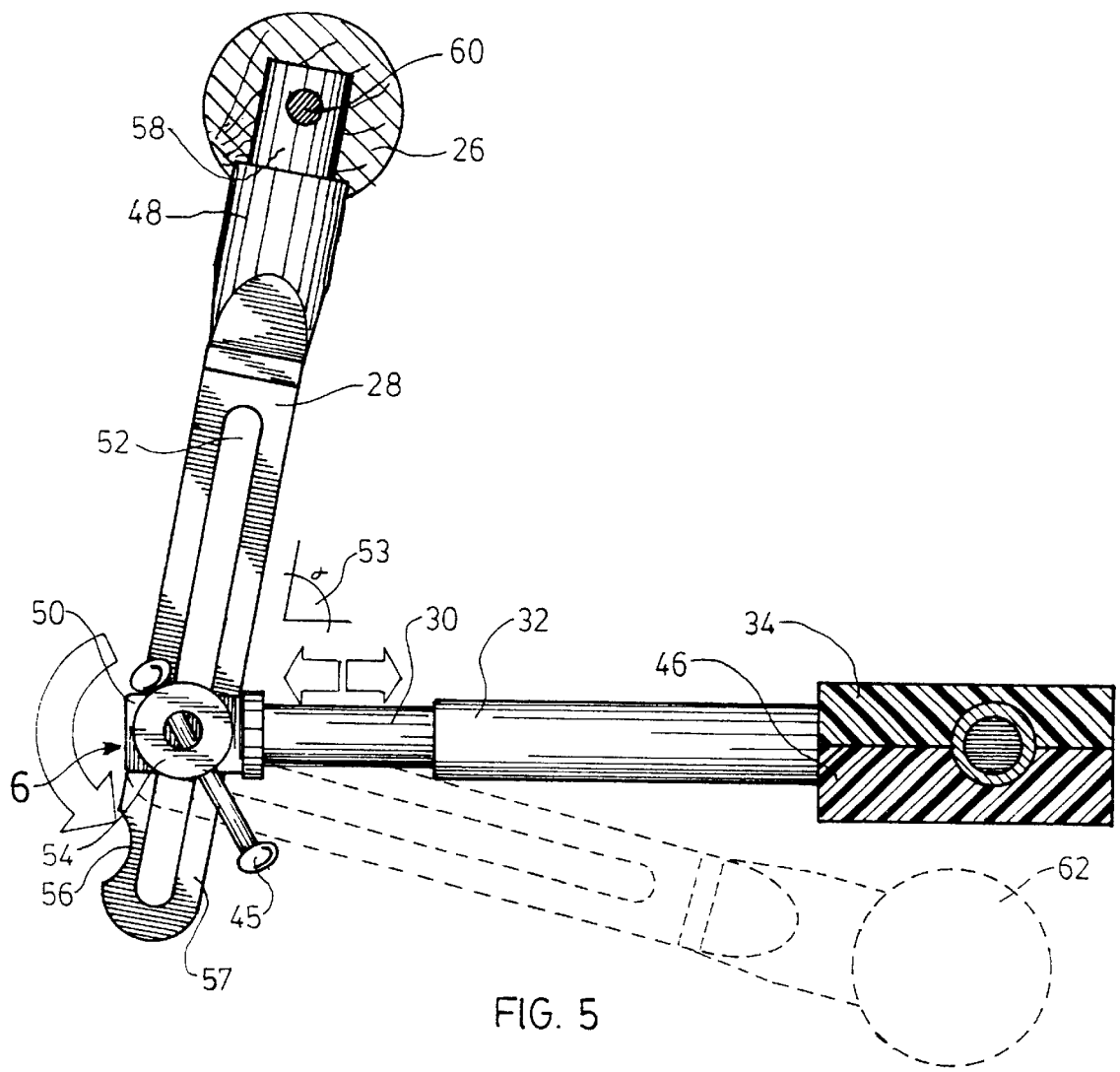
FIG. 5 is an enlarged section, according to line 5—5 of FIG. 2. in reverse

FIG. 5 illustrates the adjustment system of the smooth bar 26. The horizontal supports 30 come out of the arms 33 of the tube 32 and end in a female joint 50 where they meet the vertical support 28. A sliding groove, identified as an aperture 52 is cut lengthwise in the vertical support 28. A pivot screw 54, passing trough the female joint 50 and the aperture 52, allows adjusting the height of the bar with the handle 45. This also allows to change the angle 53 of the vertical support 28 and thus to change its position. With an adjustment of the tightening of the pivot screw 54 with the handle 45, the angle of the smooth bar 26 can be changed by hand, without touching the handle 45. The vertical support 28 has a wide part that enters the smooth bar 26 in a tenon 58 and held by a screw 60. There is a hollow 56 at the end of the vertical support 28 close to the joint 50.

FIG. 6 shows an enlarged view of the adjustment system of the bar. The female joint 50 has two grooves: a lower groove 64 and an upper groove 66. The lower groove 64 allows bringing the bar back at an angle of –350° when the vertical support 28 is pulled to the end 68 of the aperture 52 to allow rotating the bar backward and as far as under the table 22, in a stored position 62, shown in dotted line. When the vertical support 28 is not at the end 68 of the aperture 52, the back 57 of the support 28 rests against the lower groove 64, at an angle of –150°. The back 57 may also rest against the upper groove 66 at an angle, shown as approximately 70° in the drawing but its value depends on the slope of the upper groove 66.

Figure 7A:
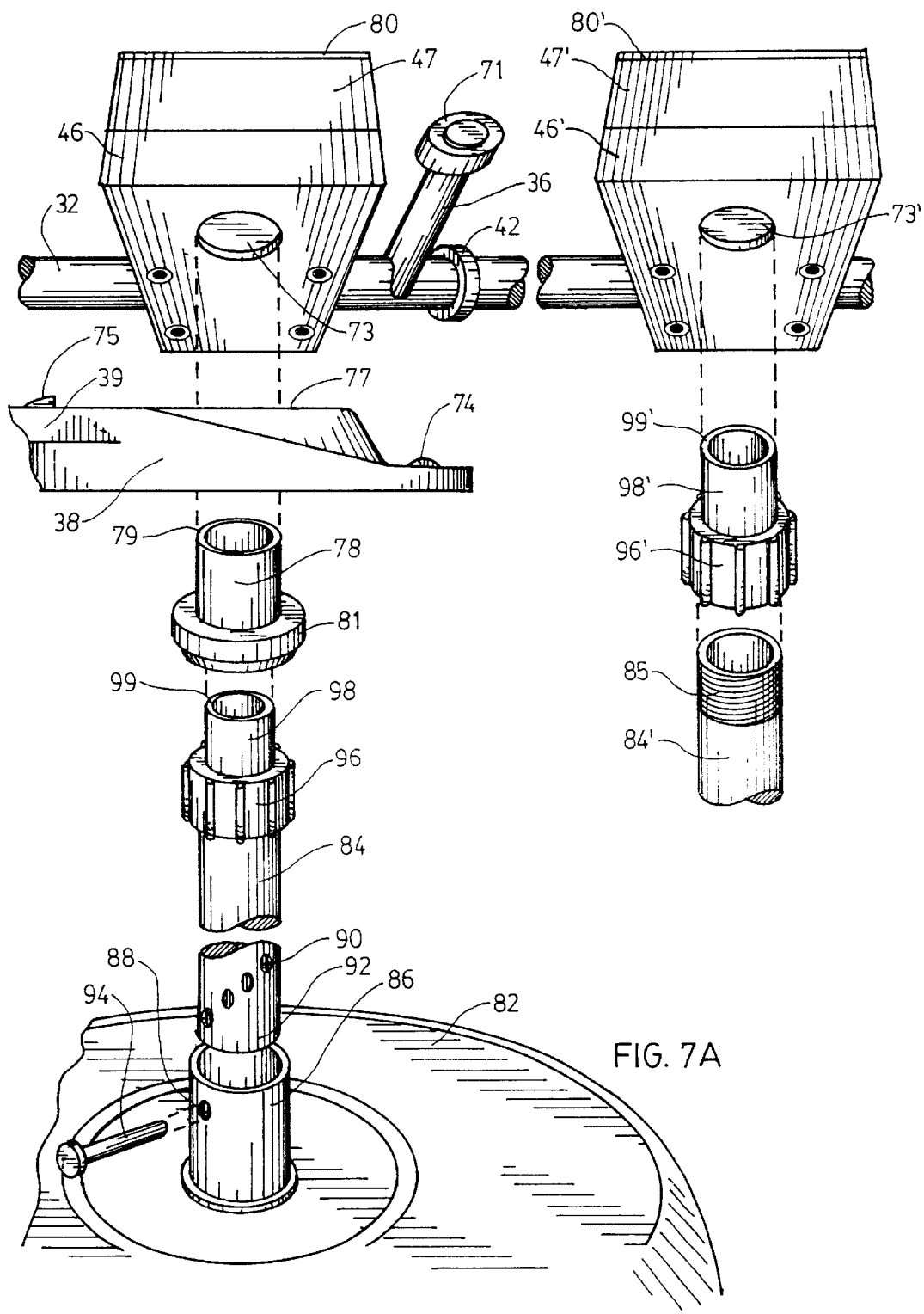
FIG. 7A is an assembly drawing of an alternative

FIG. 7A illustrates a system to fix the training bar 24. This is useful for a temporary use of the training bar 24 on an instrument 22. This system require two legs that support the training bar 24. A non-skid piece of rubber 80 is glued in the upper part 47 of the fasteners 34 (FIG. 1) and keeps them in position under the table 22. Each support leg comprises a foot 82 that that receives an adjustable post 84. The foot 82 is circular and a ring 86 is screwed in its center. The ring 86 has an opening 88 which corresponds to a series of holes 90 disposed spirally in the lower end 92 of the post 84. A pin 94 passes thought the opening 88 and enters in the corresponding hole 90, holding the post 84 in place in the ring 86. An adjustment screw, having female threads, overhangs the post 84. The adjustment screw has a grip 96 that permits to vary the length of the post 84 and consequently the height of the leg according to the height of the table 22. In the case of one of the feet, the handle top 98 of the post 84 slides in the fastener 34. The other leg is adapted to receive the handle end 99. The tube 32 is mounted as in FIG. 4. The difference is that the lower and upper parts 46 and 47 comprise a depression 73 that receives the end of the handle 99. The adjustment knob 38 moves between a lower stop 74 and an upper stop 75, located on an upper face 77. One also sees a thin pipe 78 comprising a block 81 and a pipe end 79. The height of the thin pipe 78 is similar to the thickness of the knob so that, when the thin pipe 78 is inserted through the knob, the pipe end 79 coincides with the upper face 77. The handle top 98 slides through the thin pipe 78 until the end of the handle end 99 is in the depression 73. This depression should not be too deep, so as to allow looseness, to permit the handle 39 turning to engage an added part 71 of the lever 36.

Figure 7B:
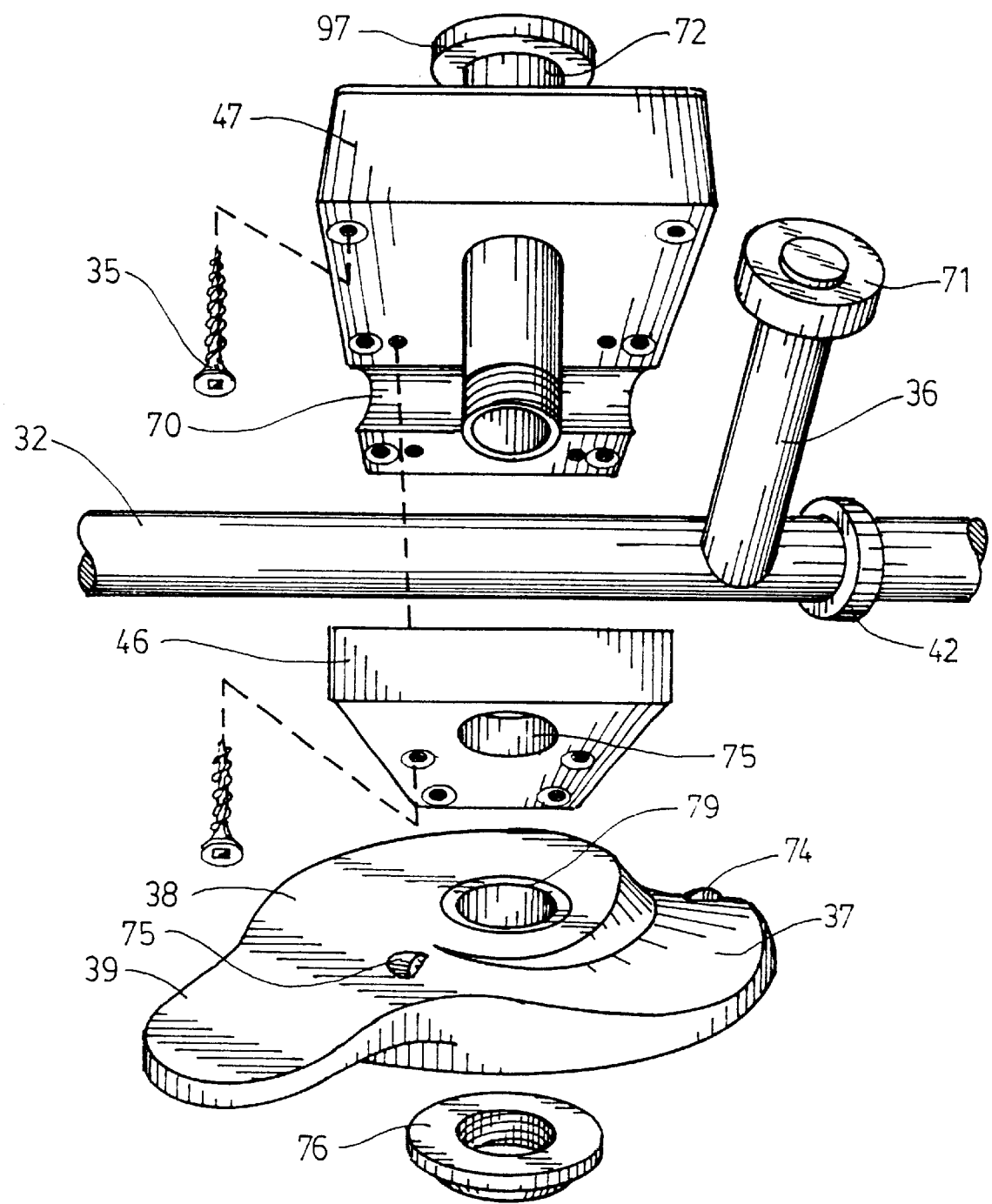
FIG. 7B is an assembly drawving, of another alternative

FIG. 7B shows an alternative of the system that fixes the training bar 24 to the table 22. This system allows the user to easily take the training bar 24 off to mount it on another instrument. The upper part 47 of the fastener 34 is fixed under the table 22 by six fixing screws 35. The lower part 46 is fixed on the upper part 47 by four Allen type screws. The tube 32 goes through the fastener 34 via a channel 70. A bolt 72 slides thought a hole in the fastener then through the knob 38, the pipe end and beyond the block 81. —FIG. 7A—A nut 76 is screwed on the bolt, under the knob to hold it in position. To take the training bar 24 off, one only has to unscrew the nut 76 and the four screws of the lower part 46 to free the tube 32.

Figure 8:
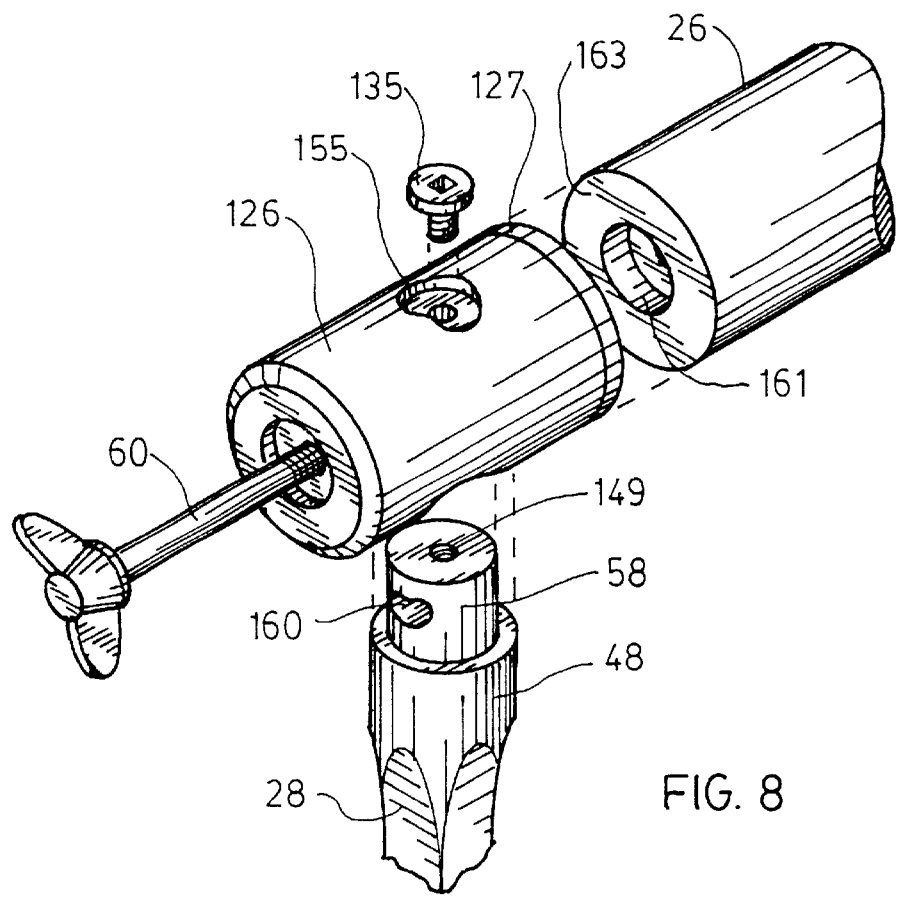
FIG. 8 is a perspective of a bar being assembled

FIG. 8 shows smooth bar 26 in perspective and localised in assembly mode in front of the tenon 58 of the widened part 48 of the vertical support 28. One notice the support screw 60 passes by through a prolonged support 126 fixed in prolongation to the vertical support 28. There is a modification of the vertical support such that, in the area close to the bar end 163 it harmonises itself with the forms of the bar. One sees a tightening screw 135 fixing the prolonged support 126 in the tenon 58 of the vertical support 28 by the intermediary of a threaded eye 149. A well 155 is used to camouflage the head of the tightening screw 135. One can add a decorative disc 127, which is used as finishing. One sees also a screw opening 160 in which the support screw 60 beam passes the part tenon 58. The screw opening 160 is horizontally widened form making it possible smooth bar 26 to have displacements in distance of the keyboard, independent on each side, the angles of variable displacement according to the eccentricity of the widened screw opening. One sees a localised end opening 161 in the center of the bar end 163".

Figure 9:
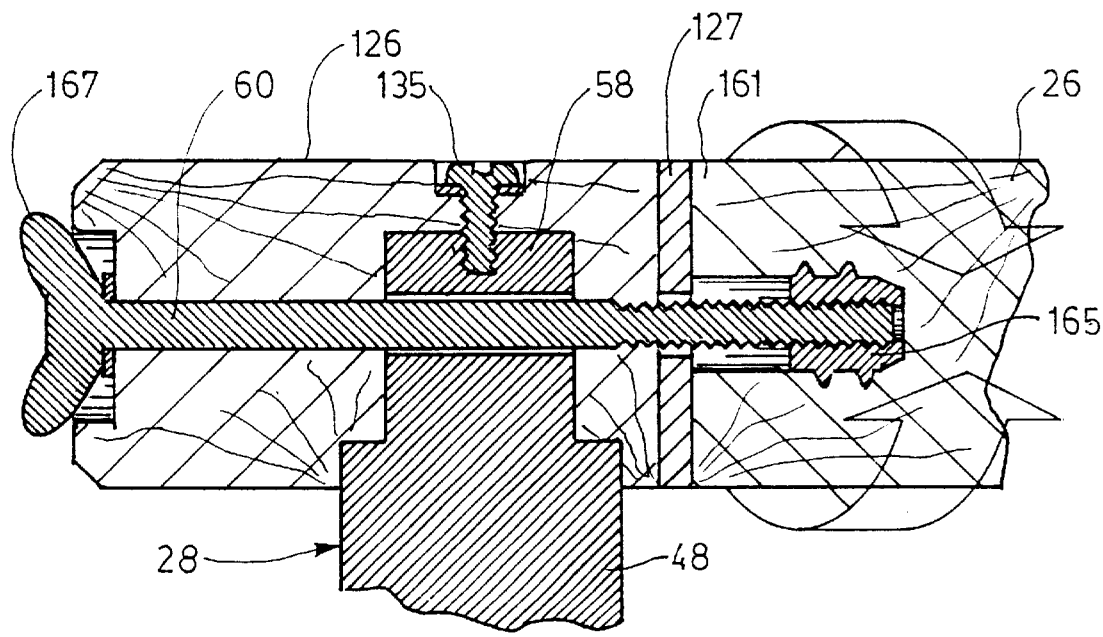
FIG. 9 is a vertical cut view in assembly position.

FIG. 9 shows a cut viewing the end opening 161 which forms a hollow section where comes to place a screw receiver 165 in which comes to fit the support screw 60 to gather smooth bar 26 with the prolonged support 126. In operation when one loosens the support screw 60 on the left side as on the right side of the bar, using ears forming the screw head 167, one allows smooth bar 26 to rotate to position forms, for example flattened or heart-shaped adjusted at a comfortable angle with the keyboard. Once in the selected position one tightens the support screw 60 to maintain in place smooth bar 26.

Utiilisation

The bar 26 is mounted on each side on the keyboard 20 and the distance and height between the bar and the keyboard can be varied to accommodate any player.

The training bar 24 helps, in an innovative way, the development of the musical technique of a player. Use of the training bar 24 helps the player take a good posture while playing, that is the back of the hand, of the wrist and the forearm forming a horizontal line and the elbow being close to the body. To take that position, one only has to place the smooth bar 26 under the wrist 36, in a way that each wrist is not raised nor lowered. A good posture must be held when moving along the keyboard.

The frequent use of the training bar 24 fixes permanently in the corporal memory a good posture so it becomes so natural to the player that he carries it in the absence of the training bar 24. Use of the trainings bar 24 also eliminates the tension on the fingers caused by the weight of the arms. With the training bar, the player is free to exercise his fingers without supporting the weight of his arms. It is only a matter of placing his wrists on the bar, at the place where it provides the desired posture. This is a good way to avoid tendinitis, a problem that all players tend to develop. It is also a great guide for the blind. The training bar 24 also helps develop the endurance and the muscular strength of the fingers, by carrying the weight of the arms. One has to support, over the smooth bar 26, the weight of the arms and shoulders using only with one or two fingers. The great maneuverability of the training bar 24 offers many possibilities that can fulfill a player's needs during various technical exercises. This is why the bar can be positioned anywhere under and over the forearms, from the elbows to the hands and higher or lower than the afore described positions, to adapt itself to each exercise. For example, one could lift the bar to place it over the hands of the player so it limits his movement when doing staccatos.

To summarise, the present invention is a training bar 24 used when doing exercises on a piano. It serves as support for the wrists and as a reference for movements of the hands along a keyboard 20. The bar comprises a smooth bar 26 that can be adjusted horizontally and vertically, fixed to a table 22 structure supporting the keyboard, and placed in relation to and parallel to the keyboard. Two vertical supports 28 are mounted at the ends of the bar. The vertical supports form parallel arms, placed perpendicularly to the smooth bar 26. A handle 39 is used to pivot a U-shaped fixing tube 32 under the keyboard. The tube 32 has two extensions each sliding in a vertical support 28 through a female joint 50. This permits a rotary movement that allows positioning the bar, in accordance with the height of the player and the exercise to be done, and also to store it under the keyboard when not used. The tube may be supported by fasteners 34, screwed to the table, or held by two stands, joined by non-screwed fasteners, thus turning the bar into a portable apparatus. In the latter case, the fasteners have teeth to cause friction against the face of the table and to prevent the tube from sliding on the table. The rod 36 may be activated by a pedal, or powered by mechanical or electrical energy. The table 22 may comprise a whole structure supporting a keyboard. In the case of a synthesiser, it could be made of plastic or aluminium, for a piano, organ or harpsichord, it might be of wood or steel. A second bar may be installed if used with an instrument having multiple keyboards. Other embodiments are possible and limited only by the scope of the appended claims:

PARTS LIST

20 keyboard
22 table
24 training bar
26 smooth bar
28 vertical support
30 horizontal support
32 fixing tube
33 tube arm
34 fastener
35 fixing screw
36 lever rod
37 inclined plane
38 adjustment knob
39 handle
40 fixed ring
41 fixing screw
42 support ring
43 positioning ring
44 key
45 handle
46 lower part
47 upper part
48 widened part
50 female joint
51 thin part
52 aperture
53 angle
54 pivot screw
56 hollow
57 back
58 tenon
60 support screw
62 stored position
64 lower groove
66 upper groove
68 aperture end
70 channel
71 added part
72 bolt
73 depression
74 lower stud
75 upper stud
76 nut
77 upper face
78 thin pipe
79 pipe end
80 rubber
81 blocking
82 base
84 post
85 thread
86 ring
88 opening
90 hole
92 lower end
94 peg
96 handle grip
98 handle top
99 handle end
126 prolonged support
127 decorative disc
135 tightening screw
149 threaded eye
155 well
160 screw opening
161 end opening
163 bar end
165 screw receiver
167 screw head

What is claimed is:

1. A training bar (24) used in relation with a keyboard and comprising:

a smooth bar (26) placed at a certain distance from said keyboard;

two arms, one at each end of said smooth bar, that serve as vertical supports (28) for said bar, said vertical supports being parallel arms mounted perpendicularly to the ends of said smooth bar;

two stands adapted to receive said vertical supports, said stands being installed under a table (22) that supports said keyboard;

means for adjusting the height between each said stand and said smooth bar;

means for rotating said vertical supports to provide said smooth bar a range of positions between that under a player's elbow and that under a player's fingers;

means of tightening said vertical supports at a desired position;

a U-shaped fixing tube (32) defining a central web and two end tube arms (33), said central web being pivoted under said table and said tube arms (33) each carrying a horizontal support (30) as an extension pivoting along with said central web, rotary means located at a junction between each said horizontal support and said vertical support, to position said smooth bar (26) for the player and exercise to practise.

2. The training bar of claim 1 wherein said horizontal supports slide in said parallel arms of said vertical supports and said rotary means comprise a female joint (50) located at the end of said horizontal support and a pivot screw (54) adapted for angular movement of said vertical support, said a pivot screw (54) comprising a handle (45) to lock said vertical support (28) in place.

3. The training bar of claim 2 wherein said means for adjusting the height comprise an aperture (52) cut longitudinally along said vertical support, said pivot screw passing through said aperture permitting to vary a rotary position at various heights.

4. The training bar of claim 1 wherein said rotary means comprise:

an lever rod (36) mounted in cantilever on said fixing tube;

an adjustment knob (38) comprising means for anchoring to said table, said knob comprising an inclined plane (37) to move said lever rod to a maximum position level with said table.

5. The training bar of claim 4 comprising a fixing screw (41) to anchor said knob to said table and a fixed ring (42) pressed against said table (22) face by said fixing screw, said fixed ring (42) having a cut out arc as a clearance to allow said rod to pass through when in use, the shifting of said inclined plane bringing about the angular shift of said rod (36), of said fixing tube (32), of said arm (33) and of said horizontal support (30).

6. The training bar of claim 4 wherein a handle (39) operates said knob and permits the adjustment of the height.

7. The training bar of claim 6 wherein said handle is hand operated.

8. The training bar of claim 4 wherein said adjustment knob comprises a thin pipe that has a block placed under a lower face of said adjustment knob, said adjustment knob being in relation with said lever rod.

9. The training bar of claim 1 wherein said smooth bar (26) is positioned over or under the forearms, from elbows to fingers and higher or lower.

10. The training bar of claim 1 comprising a fixing key (44) to fix the distance of said horizontal support (30) with respect to said tube arm (33).

11. The training bar of claim 1 wherein said fixing tube is pivotally fixed under said table by mobile fasteners fixed to said table or to the extension of a stand resting on the floor.

12. The training bar of claim 11 wherein said fasteners comprise a depression underneath, said stand comprising a base and a post that slides into said base and comprises a first adjustment into said base, said post being joined to said depression, said training bar comprising a handle that allows varying the length of said post to adapt it to keyboards of different heights.

13. The training bar of claim 12 wherein said first adjustment comprises a series of holes at the base of said post, arranged in a spiral.

14. The training bar of claim 11 wherein said fastener has a lower part and a upper part and wherein a bolt goes through one of said fasteners, said bolt having a nut that holds an adjustment knob against said lower part, said fixing tube moving freely in a channel located between said lower part and upper part, said lower part being screwed on said upper part, said upper part being screwed under the table, said post and said base not being required.

15. The training bar of claim 1 wherein said rotary means comprise a foot pedal that rotates said fixing tube.

16. The practice bar (24) of claim 1 wherein said smooth bar (26) has an ergonomic design, and wherein said vertical supports comprise means for coupling to said bar (26) and means for tightening in place said bar in desired position, said coupling means allowing the bar to swivel to change the positioning angle of said bar, said ergonomic design comprising at least two-rounded shapes, one with a large radius for rest and one sharp radius for limited touching.

17. The practice bar (24) of claim 16 wherein said means for coupling comprise a prolonged support (126) laid out in a central axis of said bar (26), said vertical support also comprising a tenon (58), a threaded eye (149) and a non-threaded screw opening (160) which is widened to allow said prolonged member to play on said tenon 58, said prolonged support (126) comprising a support screw (60) coaxial with said central axis and said bar comprises a bar end (163) adapted for receiving said support screw (60).

* * * * *